US012771558B2

(12) United States Patent
Maeseele et al.

(10) Patent No.: US 12,771,558 B2
(45) Date of Patent: Oct. 20, 2026

(54) IN-MEMORY CERTIFICATE CONVERSION SYSTEM

(71) Applicant: SAP SE, Walldorf (DE)

(72) Inventors: Francois Maeseele, Igny (FR); Jean-Rosalyn Vilsans, Andresy (FR)

(73) Assignee: SAP SE, Walldorf (DE)

( * ) Notice: Subject to any disclaimer, the term of this patent is extended or adjusted under 35 U.S.C. 154(b) by 9 days.

(21) Appl. No.: 19/095,331

(22) Filed: Mar. 31, 2025

(65) Prior Publication Data

US 2026/0303371 A1 Oct. 1, 2026

(51) Int. Cl.
*H04L 9/32* (2006.01)

(52) U.S. Cl.
CPC .................................. *H04L 9/3265* (2013.01)

(58) Field of Classification Search
CPC ..................................................... H04L 9/3265
See application file for complete search history.

(56) References Cited

U.S. PATENT DOCUMENTS 9,276,742 B1 * 3/2016 Krishnan .............. H04L 9/0894
2011/0314275 A1 * 12/2011 Gopshtein ........... G06F 21/6236 713/165
2012/0213369 A1 * 8/2012 Rich ..................... H04L 9/0894 380/277
2014/0059341 A1 * 2/2014 Edwards ............. G06F 21/6209 713/152
2015/0022844 A1 * 1/2015 Balinsky .............. H04N 1/4426 358/1.14
2016/0094346 A1 * 3/2016 Krishnan .............. H04L 9/3263 380/277
2017/0126642 A1 * 5/2017 Basin ...................... H04L 9/302
2018/0288021 A1 * 10/2018 Basin ...................... H04L 9/302

OTHER PUBLICATIONS

Aciobanitei et al., "A Cryptography API: Next Generation Key Storage Provider for Cryptography in the Cloud", Jun. 2018, 10th International Conference on Electronics, Computers and Artificial Intelligence, pp. 1-4 (Year: 2018).*

Yangtao et al., "A Design of Certificate Authority Based on Elliptic Curve Cryptography", Aug. 2010, Ninth International Symposium on Distributed Computing and Applications to Business, Engineering and Science, pp. 454-457 (Year: 2010).*

* cited by examiner

*Primary Examiner* — Kenneth W Chang
(74) *Attorney, Agent, or Firm* — SCHWEGMAN LUNDBERG & WOESSNER, P.A.

(57) ABSTRACT

A in-memory certificate conversion system configured to determine that a configuration file contains a JKS certificate that is not compatible with a live data connector (LDC) and automatically convert the JKS certificate to a Public-Key Cryptography Standards (PKCS12) format certificate via a Java Virtual Machine of the LDC by generating a PKCS12 container containing the public key, private key, and the chain of trusted authority certificates for the JKS certificate and generating a PKCS12 format certificate by exporting the PKCS12 container as a bytes array. The in-memory conversion system provides, via the LDC, the PKCS12 format certificate to a web server for SSL configuration, where the web server is configured to establish secure communications using the PKCS12 format certificate in real time from a request to access a service via the web server.

20 Claims, 7 Drawing Sheets

IN-MEMORY CERTIFICATE CONVERSION SYSTEM

BACKGROUND

Secure Sockets Layer (SSL) certificates are essential security components used in web servers to establish secure encrypted connections. Java KeyStore (JKS) is a certificate format specifically designed for Java technology environments, while PKCS12 (Public-Key Cryptography Standards) is an industry standard certificate format that has been widely adopted across different technologies.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
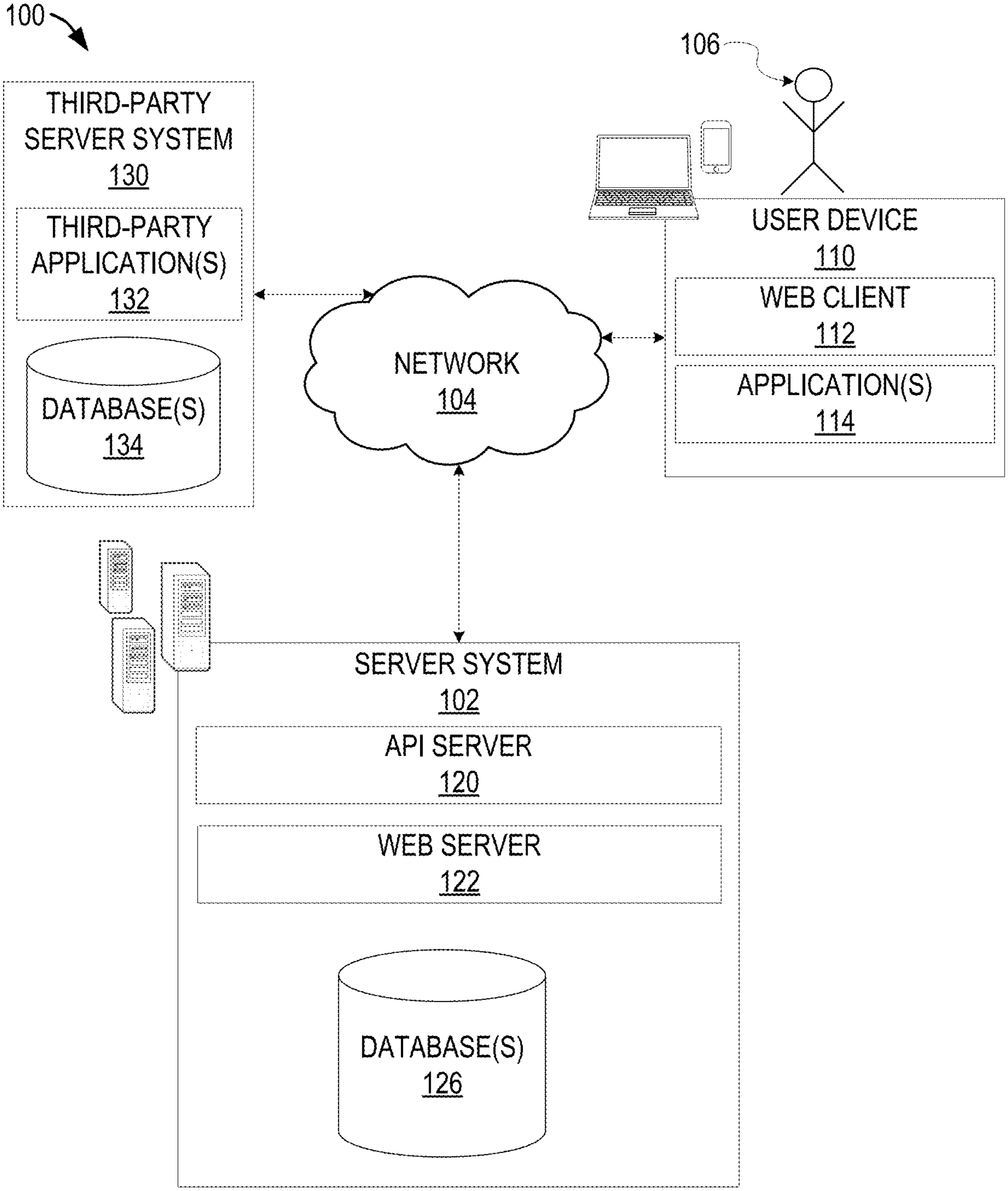
FIG. 1 is a block diagram illustrating a networked system, according to some examples.

JKS certificates were historically used by Java-based applications, such as SAP BusinessObjects, to secure web portals on corporate intranets. However, as businesses adopt newer technologies like .NET, which only supports the PKCS12 standard format, there is a need to convert existing JKS certificates. This conversion requirement commonly arises when organizations maintain legacy Java systems while implementing newer technology stacks, creating a mixed-technology environment that must interoperate securely.

One option for certificate conversion involves using Java command-line tools like keytool to manually convert JKS certificates to PKCS12 format. This process requires careful handling of certificate components, including private/public key pairs and certificate authority chains. A certificate contains multiple elements: a private key, a public key, and a chain of trusted authority certificates that establish the certificate's validity. The authority chain may include multiple certificates, starting from a globally trusted root certificate authority down to specific organizational certificates. When converting between formats, all these components must be properly preserved while maintaining password protection and security parameters to ensure the certificate remains functional in its new format. This process can introduce errors such as forgetting to specify passwords or incorrectly configuring certificate parameters, which can result in non-functional SSL certificates. Further, this results in a complex installation and updates process. For example, instead of updating systems with a seamless transition across numerous entities, an update can only occur after the certificate conversion has occurred by an entity for each system. Otherwise, each system will not work after the update.

The certificate conversion system described herein address at least these technical problems in several ways. First, it provides a seamless and automated experience for entities by eliminating the need for manual intervention during certificate conversion. For example, when entities update their Live Data Connector (LDC) installation, the certificate conversion system automatically handles the conversion process without requiring them to manually convert certificates or modify configuration files. This automation significantly reduces the complexity of the installation and update process.

Second, the in-memory conversion system eliminates human errors that commonly occur during manual conversion. With manual conversion using keytool, entities may make critical mistakes such as forgetting to specify passwords or incorrectly configuring certificate parameters, which can result in non-functional SSL certificates. The automated process ensures all certificate components—including private keys, public keys, and certificate authority chains—are properly preserved and configured.

Third, the in-memory conversion system leverages existing infrastructure by utilizing LDC's embedded Java Virtual Machine, which already supports both JKS and PKCS12 formats. This efficient approach performs the conversion in-memory, maintaining security while providing seamless integration between Java and .NET technologies. The result is a more robust and maintainable system that reduces support calls and simplifies the customer experience during LDC updates and configurations.

Specifically, the in-memory conversion system implements an automatic, in-memory conversion system that leverages LDC's embedded Java Virtual Machine to perform seamless certificate conversion. The solution takes advantage of Java's native ability to handle both JKS and PKCS12 formats, reading the JKS certificate's content, extracting the key pairs and trusted certificate authorities, and creating a new PKCS12 container with the same elements using Java PKCS12 API. The converted certificate is then exported as a bytes array and provided to the .NET web server through an interop mechanism, eliminating the need for manual conversion while maintaining security and functionality. This automated approach ensures proper handling of certificate chains, private/public key pairs, and password protection, while providing a seamless experience for entities updating their LDC installations.

FIG. 1 is a block diagram illustrating a networked system 100, according to some example embodiments. The system 100 can include one or more user computing devices such as user device 110. The user device 110 can comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, wearable computing device, or any other computing or communication device that a user may utilize to access the networked system 100. In some embodiments, the user device 110 comprises a display module (not shown) to display information (e.g., in the form of user interfaces). In further embodiments, the user device 110 can comprise one or more of touch screens, accelerometers, gyroscopes, cameras, microphones, global positioning system (GPS) devices, and so forth. The user device 110 can be a device of a user 106 that is used to access and utilize one or more applications or systems provided by server system 102 or third-party applications 132 and third-party system 130, among other applications.

One or more users 106 may be a person, a machine, or other means of interacting with the user device 110. In example embodiments, the user 106 may not be part of the system 100 but may interact with the system 100 via the user device 110 or other means. For instance, the user 106 can provide input (e.g., touch screen input or alphanumeric input) to the user device 110 and the input can be communicated to other entities in the system 100 (e.g., third-party server system 130, server system 102) via a network 104. In this instance, the other entities in the system 100, in response to receiving the input from the user 106, communicate information to the user device 110 via the network 104 to be presented to the user 106. In this way, the user 106 can interact with the various entities in the system 100 using the user device 110.

The system 100 further includes a network 104. One or more portions of network 104 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The user device 110 can access the various data and applications provided by other entities in the system 100 via web client 112 (e.g., a browser, such as the Internet Explorer® browser developed by Microsoft® Corporation of Redmond, Washington State) or one or more applications 114. The user device 110 can include one or more applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an analytics or business intelligence application, and the like.

In some embodiments, one or more applications 114 are included in a given user device 110, and configured to locally provide the user interface and at least some of the functionalities, with the application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, and so forth. Conversely, one or more applications 114 may not be included in the user device 110, and then the user device 110 can use its web browser to access the one or more applications hosted on other entities in the system 100 (e.g., third-party server system 130, server system 102).

A server system 102 provides server-side functionality via the network 104 (e.g., the Internet or wide area network (WAN)) to one or more third-party server system 130 and/or one or more user devices 110. The server system 102 can include an application program interface (API) server 120, a web server 122, among other servers and systems, that can be communicatively coupled with one or more databases 126.

The one or more databases 126 comprise storage devices that store data related to users of the system 100, applications associated with the system 100, cloud services, machine learning models, data related to entities/products/services, and so forth. The one or more databases 126 can further store information related to third-party server system 130, third-party applications 132, third-party database(s) 134, user devices 110, applications 114, users 106, and so forth. In some examples, the one or more databases 126 is cloud-based storage.

The server system 102 can be a cloud computing environment, according to some example embodiments, such as an SAP Analytics Cloud or other cloud system. The server system 102, and any servers associated with the server system 102, can be associated with a cloud-based application, in some examples.

The system 100 further includes one or more third-party server system 130. The one or more third-party server system 130 can include one or more third-party application(s). The one or more third-party application(s) 132, executing on third-party server(s) 130, can interact with the server system 102 via API server 120 via a programmatic interface provided by the API server 120. For example, one or more of the third-party applications 132 can request and utilize information from the server system 102 via the API server 120 to support one or more features or functions on a website hosted by the third party or an application hosted by the third party. In some examples, one or more third-party server system 130 comprises an on-premise application or system that communicates via a Live Data Connector (LDC) to a cloud based server system 102. The LDC serves a bridge between the cloud-based server system 102 and the third-party server system 130 (e.g., a corporate network (on-premise)) where an application (e.g., third-party application 132) and customer data (e.g., database(s) 134) reside.

The third-party website or application 132, for example, can provide access to functionality and data supported by third-party server system 130. In one example embodiment, the third-party website or application 132 provides access to functionality that is supported by relevant functionality and data in the third-party server system 130. One example third-party application is an analytics or business intelligence application. In another example, a third-party server system 130 is a system associated with an entity that accesses cloud services via server system 102.

The third-party database(s) 134 can be storage devices that store data related to users of the third-party server system 130, applications associated with the third-party server system 130, cloud services, machine learning models, SSL certificates, and so forth. The one or more databases 134 can further store information related to third-party applications 132, user devices 110, applications 114, users 106, and so forth. In one example, the one or more databases 134 are cloud-based storage.

Figure 2:
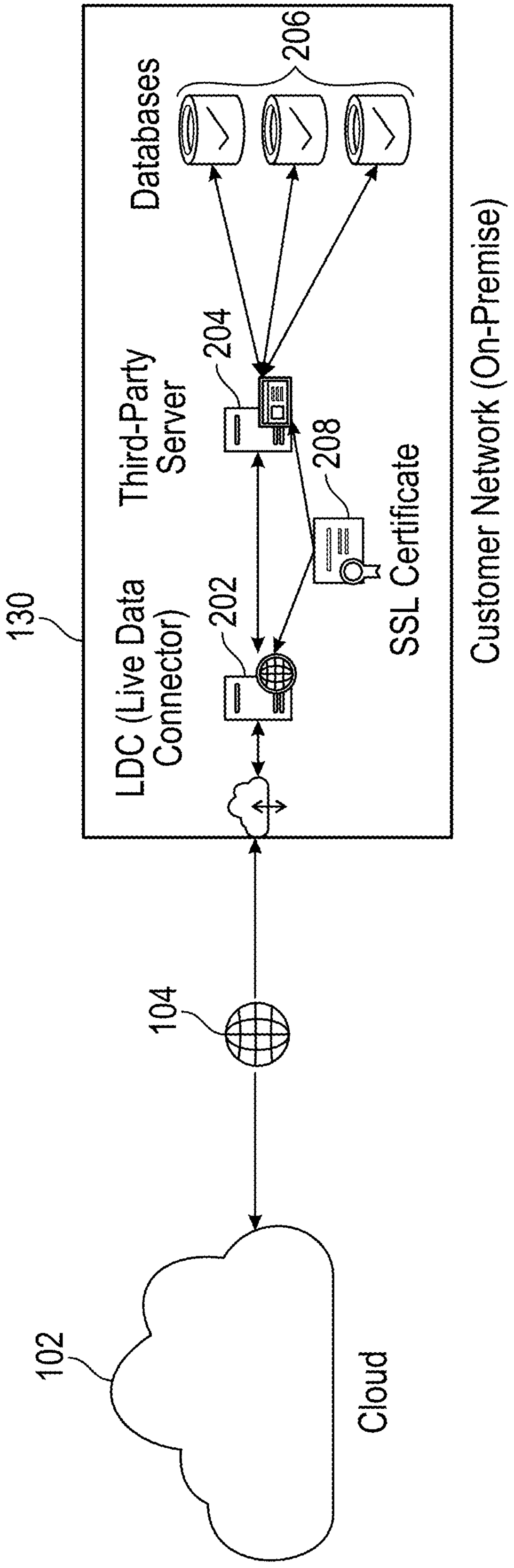
FIG. 2 is a diagram illustrating example systems involved with the in-memory certification conversion system, according to some examples.

FIG. 2 shows an example system involved in the in-memory certification conversion system described in further detail below. The server system 102 is a cloud computing system ("cloud") in FIG. 2 connected to a third-party server system 130 via network 104 (e.g., the Internet). The server system 102 can be an SAP Analytics Cloud (SAC), in some examples, which is an SAP product that allows customers to access their on-premise business intelligence reports from the cloud 102 using the LDC 202 product. The LDC 202 serves as a bridge between the cloud 102 and the third-party system 130 which is an on-premise customer network where one or more applications reside that provide analytics or business intelligence services, and a number of databases 206 where customer data resides. The one or more applications (e.g., SAP BusinessObjects) provides a web portal on the customer intranet, typically secured with an SSL certificate 208 in Java KeyStore (JKS) format. The SSL certificate is utilized by the third-party server 204 to access and exchange data with services in the cloud 102. In some examples, the LDC 202 and the services provided by the third-party server 204 are provided by an entity providing services in the cloud 102.

For example, when entities want to access their reports from the cloud 102, they need to install LDC, which also requires an SSL certificate. Entities often expect to use their existing BusinessObjects SSL certificate with LDC. However, LDC only supports SSL certificates in PKCS12 (Public-Key Cryptography Standards) format, not the JKS format used by BusinessObjects. The in-memory certification conversion system of the LDC 202 provides for a conversion from the JKS format that is not supported by the LDC to a PKCS12 format that is supported. In this way, the in-memory certification conversion system makes an "on the fly" (e.g., real time or near real time) JKS certificate conversion to PKCS12 format.

Figure 3:
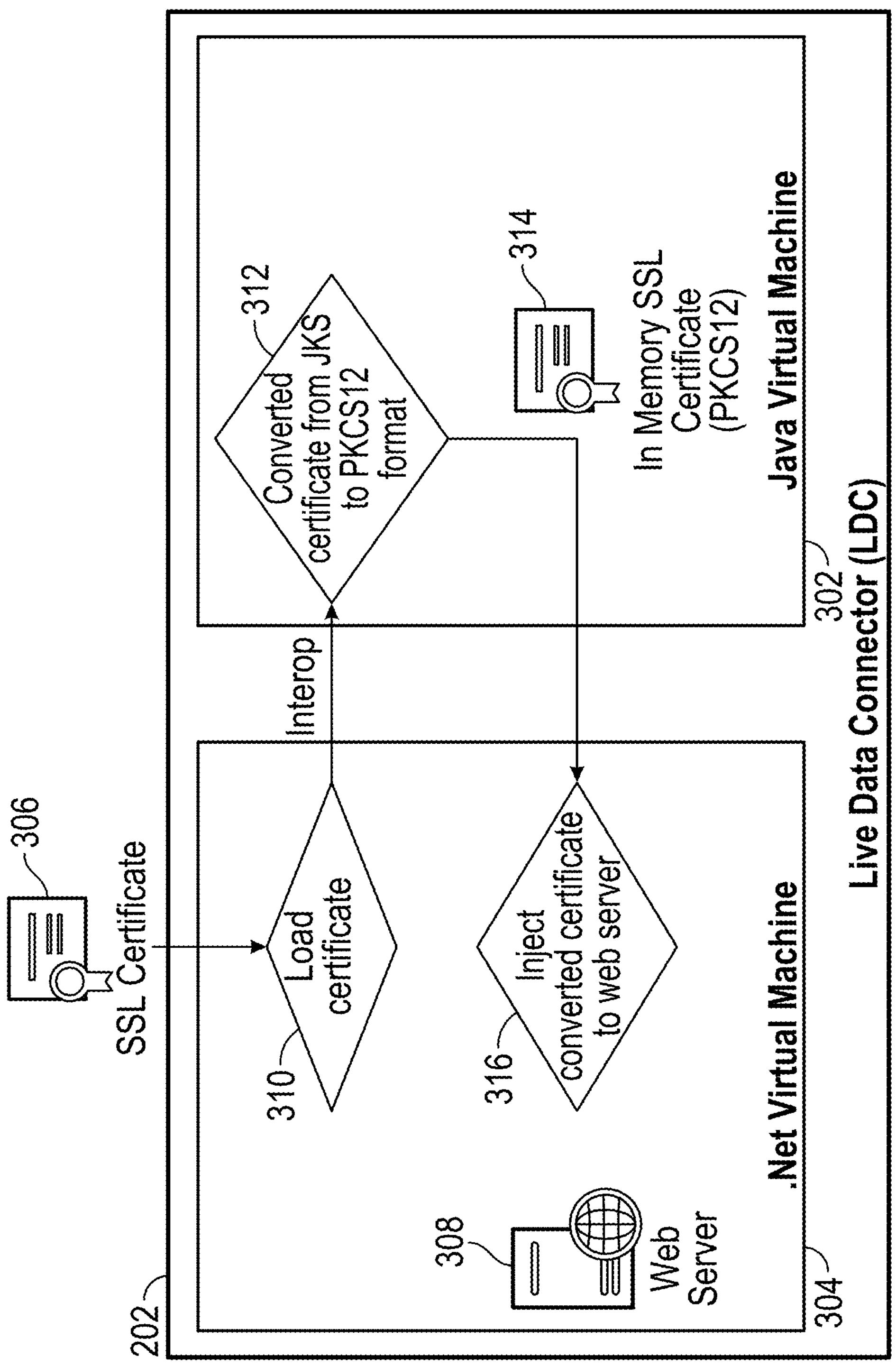
FIG. 3 is a diagram illustrating example components of a live data connector (LDC), according to some examples.

FIG. 3 illustrates some example components of the LDC 202. In this example, the LDC comprises a Java Virtual Machine 302 and a .Net Virtual Machine 304. The LDC 202 accesses or receives an SSL certificate 306 via the .Net Virtual machine 304 and at 310 determines if it is in a proper format (e.g., PKCS12 certificate format) to use in communications with the cloud 102 via the web server 308. If the SSL certificate 306 is not in the proper format, the LDC via the .Net Virtual Machine 304 calls a function 312 via the Java virtual Machine 302 to convert the SSL certificate 306 into the proper format 314 which is returned to the .Net Virtual Machine to be injected at 316 into the web server 308. Since the LDC 202 embeds a Java Virtual Machine 302, the in-memory certification conversion system can take advantage of the fact that Java supports both JKS and PKCS12 certificate formats and get back the corresponding certificate bytes content to the calling .Net application through an interop mechanism and provide the bytes content to the embedded web server 308.

Figure 4:
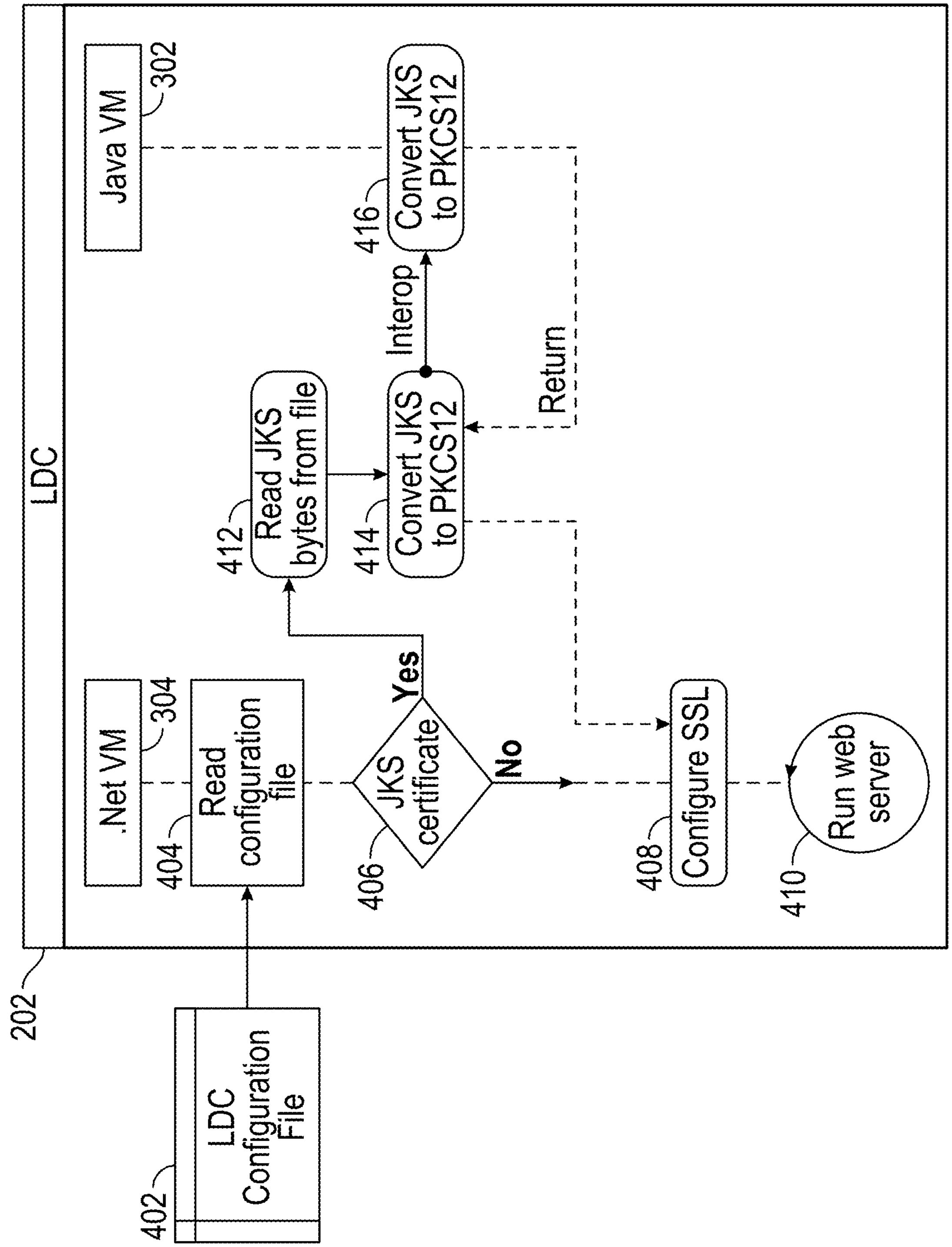
FIG. 4 is a diagram illustrating the process of converting an SSL certificate to format that can be utilized by the LDC and a webserver, according to some examples.

FIG. 4 illustrates the process of converting an SSL certificate to format that can be utilized by the LDC 202 and web server 308. In this example, the LDC accesses an LDC configuration file 402 and via the .Net Virtual Machine 304, the LDC reads the configuration file at 404, determines if the SSL certificate 306 is a JKS certificate at 406. If it is not a JKS certificate, but is in the proper format PKCS12 certificate format, the LDC 202 configures the SSL at 408 to run the web server at 410. If the LDC 202 via the .Net Virtual machine 304 determines that the SSL certificate 306 is a JKS certificate at 406, the LDC reads the JKS bytes from the LDC configuration file 402 at 412 and the LDC 202 calls a function 414 to convert the JKS to PKCS12 via the Java Virtual Machine 302. The JKS certificate is converted via the Java virtual machine 302 at 416 to a PKCS12 certificate, as described in further detail with respect to FIG. 5. The LDC 202 then returns the converted certificate to configure the SSL at 408 to run the web server at 410.

Figure 5:
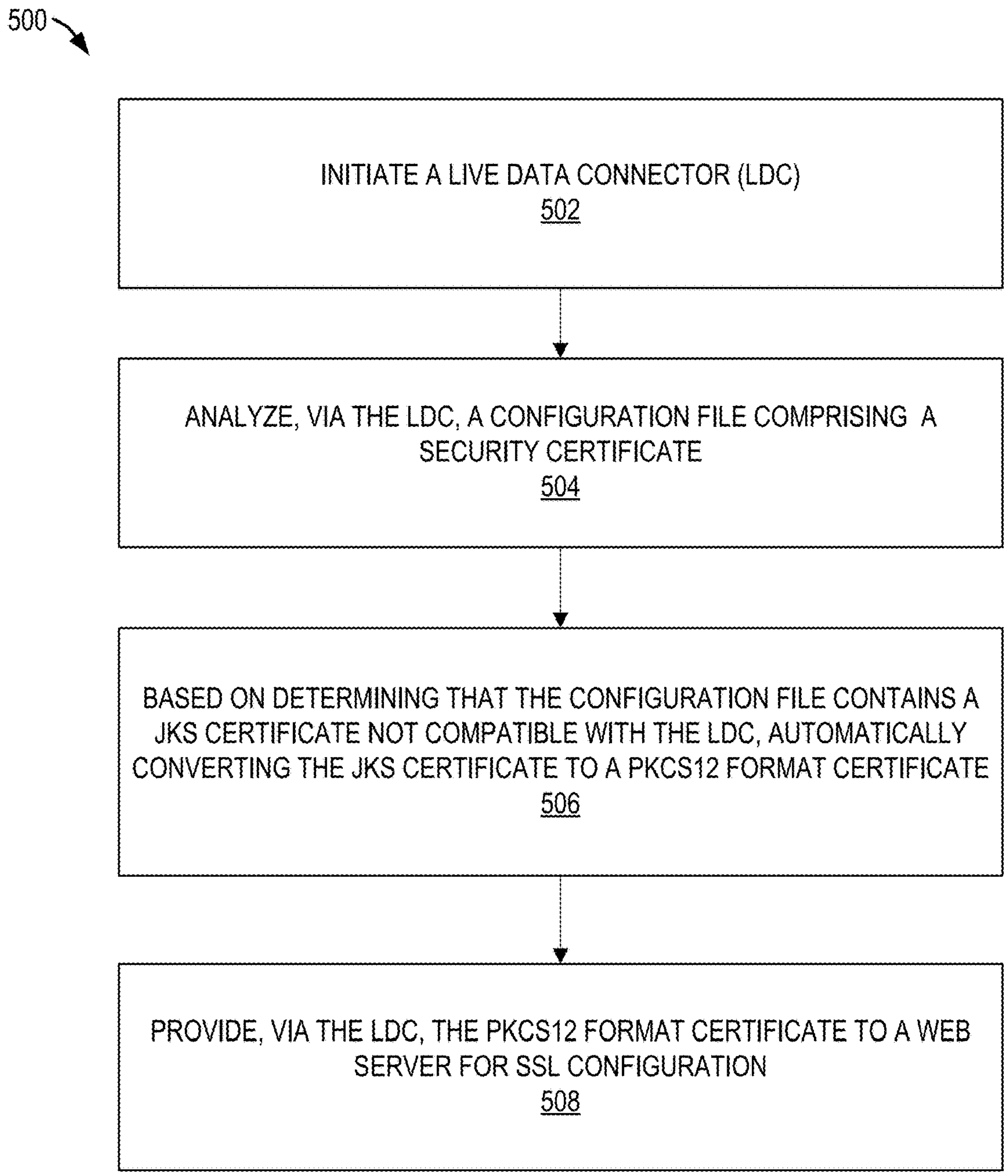
FIG. 5 is a flow chart illustrating aspects of a method, according to some examples.

FIG. 5 is a flow chart illustrating aspects of a method 500, for an in-memory certificate conversion system, according to some example embodiments. For illustrative purposes, method 500 is described with respect to FIGS. 1-3. It is to be understood that method 500 can be practiced with other system configurations in other embodiments.

In operation 502, a computing system, such as a third-party server system 130, initiates an LDC 202. For example, a user device 110 may request to access data or services via the third-party server system 130 that are provided via cloud services, via server system 102. When the third-party system 130 receives the request, it initiates the LDC 202 to allow for secure and compatible communications between an application utilized on the user device 110, or a third-party application 132 utilized by the user device 110, and the cloud 102. The LDC 202 is configured to receive requests from the cloud system 102 and facilitate communications between the cloud system 102 and the on-premise application (e.g., third-party application 132) using a PKCS12 format certificate.

The LDC 202 accesses a configuration file comprising a security certificate, such as an SSL certificate, to establish that secure and compatible communications. In operation 504, the LDC 202 analyzes the configuration file to determine whether the configuration file contains a JKS certificate to be used by the LDC 202 to exchange data between an on-premise application and a cloud system. For example, the LDC 202 can determine that the configuration file comprises a JKS certificate based on a file extension for a security certificate in the configuration file. As explained above, the LDC 202 comprises a .Net Virtual Machine 304 and a Java Virtual Machine 302. In some examples, the LDC 202 accesses the configuration file and determines whether the configuration file contains a JKS certificate is done via the .Net Virtual Machine 304 of the LDC 202. In one example, the JKS certificate is associated with the on-premise application.

In operation 506, based on determining that the configuration file contains a JKS certificate that is not compatible with the LDC 202, the LDC 202 converts the JKS certificate to a Public-Key Cryptography Standards (PKCS12) format certificate via a Java Virtual Machine of the LDC 202 by performing the following operations. The LDC 202 determines a key/pair certificate by determining a public key for the JKS certificate and a private key for the JKS certificate. The LDC 202 determines a chain of trusted authority certificates that establish validity of the JKS certificate. The chain of trusted authority certificates comprises at least a global root authority certificate. In some examples, the chain of trusted authority certificates comprises a global root authority certificate and at least one of a company authority certificate or a regional authority certificate.

For example, the LDC 202 uses a Java JKS API, other similar method, to iterate through a JKS container where each entry in the JKS container is either a key/pair certificate or a trusted certificate authority. For each entry the LDC 202 can read their elementary parts (e.g., private key, public key) and then create a new PKCS12 container with the same elements using a Java PKCS12 API or similar method. In this way LDC 202 generates a PKCS12 container containing the public key, private key, and the chain of trusted authority certificates.

Once the container is built, the LDC 202 exports it as bytes array and returns the bytes array to the .NET method that requested the conversion. For example, in operation 508, the LDC 202 provides the PKCS12 format certificate to a web server 308 for SSL configuration. The web server 308 can be configured to establish secure communications using the PKCS12 format certificate in real time from a request to access a service via the web server 308. Thus, the web server 308 can then use the PKCS12 certificate for its SSL configuration, without any human intervention. In some examples, the PKCS12 format certificate is provided via the .Net Virtual Machine 304 of the LDC 202. In this way, the PKCS12 format certificate is generated and provided to the web server in real time or near real time from initiating the LDC 202.

If the LDC 202 determines that the security certificate is not a JKS certificate, but is already a PKCS12 certificate, then the LDC 202 can directly provide the PKCS12 certificate to the web server 308 for SSL configuration and so on as described above with respect to operation 508. For example, the LDC 202 can be initialized above in operation 502 based on a first request to access a service via the web server. The LDC 202 can receive a second request to access a different service via the web server. The LDC accesses a second configuration file associated with a second security certificate and analyzes the second configuration file to determine whether the second configuration file contains a JKS certificate to be used by the LDC to exchange data between an on-premise application and a cloud system, as explained above with respect to operation 504. Based on determining that the configuration file does not contain a JKS certificate, the LDC 202 the second security certificate to the web server for SSL configuration.

In view of the above disclosure, various examples are set forth below. It should be noted that one or more features of an example, taken in isolation or combination, should be considered within the disclosure of this application.

Example 1. A computer-implemented method comprising:
- initiating a Live Data Connector (LDC);
- accessing, via the LDC, a configuration file comprising a security certificate;
- analyzing, via the LDC, the configuration file to determine whether the configuration file contains a JKS certificate to be used by the LDC to exchange data between an on-premise application and a cloud system;
- based on determining that the configuration file contains a JKS certificate that is not compatible with the LDC, automatically converting the JKS certificate to a Public-Key Cryptography Standards (PKCS12) format certificate via a Java Virtual Machine of the LDC by performing operations comprising:
  - determining a public key for the JKS certificate;
  - determining a private key for the JKS certificate;
  - determining a chain of trusted authority certificates that establish validity of the JKS certificate;
  - generating a PKCS12 container containing the public key, private key, and the chain of trusted authority certificates; and
  - generating a PKCS12 format certificate by exporting PKCS12 container as a bytes array; and
- providing, via the LDC, the PKCS12 format certificate to a web server for SSL configuration, the web server configured to establish secure communications using the PKCS12 format certificate in real time from a request to access a service via the web server.

Example 2. A computer-implemented method according to any of the previous examples, wherein determining that the configuration file is associated with a JKS certificate is based on a file extension for a security certificate in the configuration file.

Example 3. A computer-implemented method according to any of the previous examples, wherein the PKCS12 format certificate is provided via a .Net Virtual Machine of the LDC.

Example 4. A computer-implemented method according to any of the previous examples, wherein accessing the configuration file and determining whether the configuration file contains a JKS certificate is done via a .Net Virtual Machine of the LDC.

Example 5. A computer-implemented method according to any of the previous examples, wherein the PKCS12 format certificate is generated and provided to the web server in real time or near real time from initiating the LDC.

Example 6. A computer-implemented method according to any of the previous examples, wherein the PKCS12 format certificate is provided to the web server via a. Net Virtual Machine of the LDC.

Example 7. A computer-implemented method according to any of the previous examples, wherein the LDC is initialized based on a first request to access a service via the web server, and the method further comprises:
- receiving, at the LDC, a second request to access a service via a second web server;
- accessing, via the LDC, a second configuration file associated with a second security certificate;
- analyzing, via the LDC, the second configuration file to determine whether the second configuration file contains a JKS certificate to be used by the LDC to exchange data between an on-premise application and a cloud system; and
- based on determining that the configuration file does not contain a JKS certificate, providing the second security certificate to the second web server for SSL configuration.

Example 8. A computer-implemented method according to any of the previous examples, wherein the JKS certificate is associated with the on-premise application.

Example 9. A computer-implemented method according to any of the previous examples, wherein the chain of trusted authority certificates comprises a global root authority certificate and at least one of a company authority certificate or a regional authority certificate.

Example 10. A computer-implemented method according to any of the previous examples, wherein the LDC is configured to receive requests from the cloud system and facilitate communications between the cloud system and the on-premise application using the generated PKCS12 format certificate.

Example 11. A system comprising:
- a memory that stores instructions; and
  - one or more processors configured by the instructions to perform operations comprising:
- initiating a Live Data Connector (LDC);
- accessing, via the LDC, a configuration file comprising a security certificate;
- analyzing, via the LDC, the configuration file to determine whether the configuration file contains a JKS certificate to be used by the LDC to exchange data between an on-premise application and a cloud system;
- based on determining that the configuration file contains a JKS certificate that is not compatible with the LDC, automatically converting the JKS certificate to a Public-Key Cryptography Standards (PKCS12) format certificate via a Java Virtual Machine of the LDC by performing operations comprising:
  - determining a public key for the JKS certificate;
  - determining a private key for the JKS certificate;
  - determining a chain of trusted authority certificates that establish validity of the JKS certificate;
  - generating a PKCS12 container containing the public key, private key, and the chain of trusted authority certificates; and
  - generating a PKCS12 format certificate by exporting PKCS12 container as a bytes array; and
- providing, via the LDC, the PKCS12 format certificate to a web server for SSL configuration, the web server configured to establish secure communications using the PKCS12 format certificate in real time from a request to access a service via the web server.

Example 12. A system according to any of the previous examples, wherein determining that the configuration file is associated with a JKS certificate is based on a file extension for a security certificate in the configuration file.

Example 13. A system according to any of the previous examples, wherein the PKCS12 format certificate is provided via a .Net Virtual Machine of the LDC.

Example 14. A system according to any of the previous examples, wherein accessing the configuration file and determining whether the configuration file contains a JKS certificate is done via a .Net Virtual Machine of the LDC.

Example 15. A system according to any of the previous examples, wherein the PKCS12 format certificate is generated and provided to the web server in real time or near real time from initiating the LDC.

Example 16. A system according to any of the previous examples, wherein the PKCS12 format certificate is provided to the web server via a .Net Virtual Machine of the LDC.

Example 17. A system according to any of the previous examples, wherein the LDC is initialized based on a first request to access a service via the web server, and the operations further comprise:

receiving, at the LDC, a second request to access a service via a second web server;

accessing, via the LDC, a second configuration file associated with a second security certificate;

analyzing, via the LDC, the second configuration file to determine whether the second configuration file contains a JKS certificate to be used by the LDC to exchange data between an on-premise application and a cloud system; and based on determining that the configuration file does not contain a JKS certificate, providing the second security certificate to the second web server for SSL configuration.

Example 18. A system according to any of the previous examples, wherein the JKS certificate is associated with the on-premise application.

Example 19. A system according to any of the previous examples, wherein the chain of trusted authority certificates comprises a global root authority certificate and at least one of a company authority certificate or a regional authority certificate.

Example 20. A non-transitory computer-readable medium comprising instructions stored thereon that are executable by at least one processor to cause a computing device to perform operations comprising:

initiating a Live Data Connector (LDC);

accessing, via the LDC, a configuration file comprising a security certificate;

analyzing, via the LDC, the configuration file to determine whether the configuration file contains a JKS certificate to be used by the LDC to exchange data between an on-premise application and a cloud system;

based on determining that the configuration file contains a JKS certificate that is not compatible with the LDC, automatically converting the JKS certificate to a Public-Key Cryptography Standards (PKCS12) format certificate via a Java Virtual Machine of the LDC by performing operations comprising:

determining a public key for the JKS certificate;

determining a private key for the JKS certificate;

determining a chain of trusted authority certificates that establish validity of the JKS certificate;

generating a PKCS12 container containing the public key, private key, and the chain of trusted authority certificates; and generating a PKCS12 format certificate by exporting PKCS12 container as a bytes array; and providing, via the LDC, the PKCS12 format certificate to a web server for SSL configuration, the web server configured to establish secure communications using the PKCS12 format certificate in real time from a request to access a service via the web server.

Figure 6:
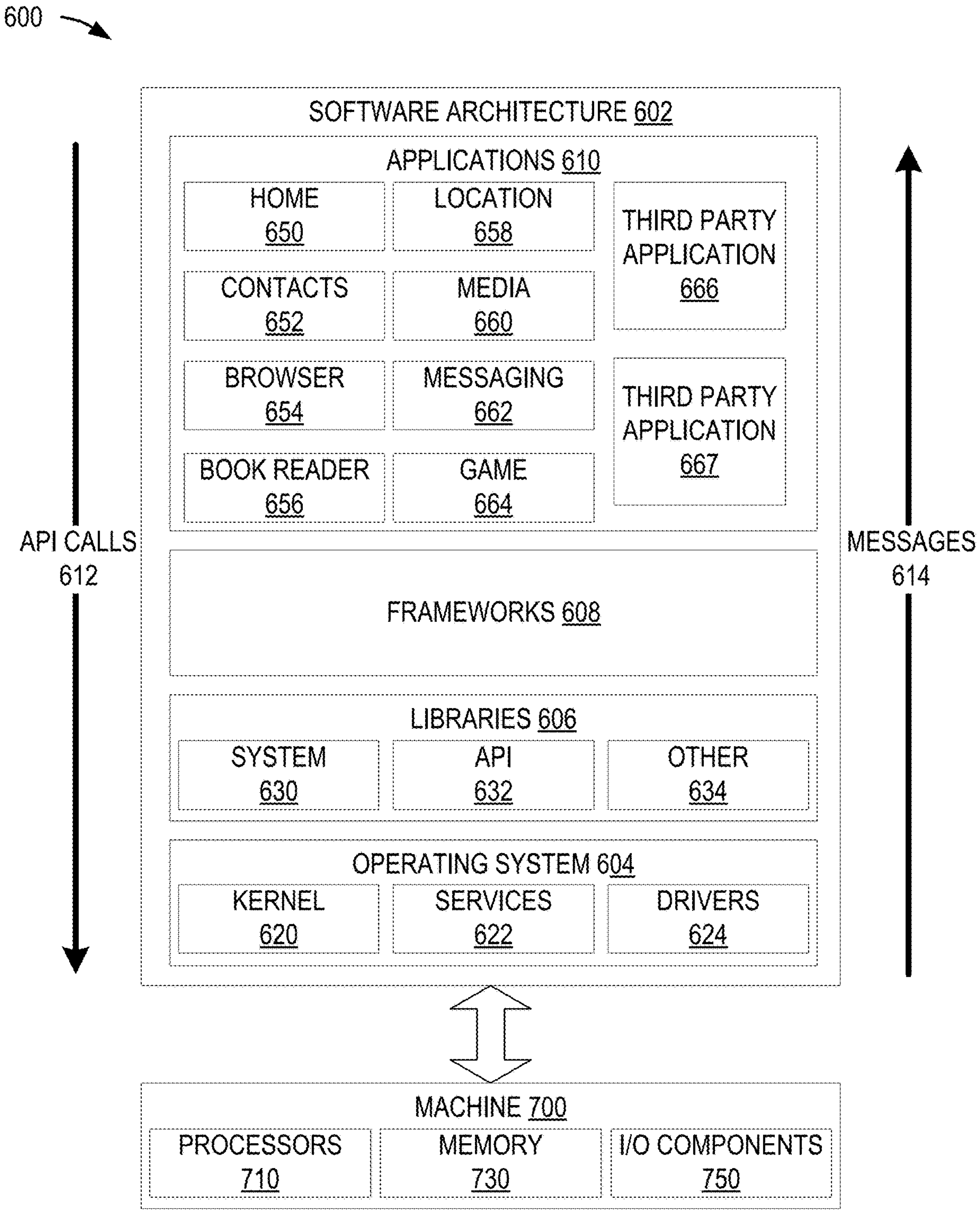
FIG. 6 is a block diagram illustrating an example of a software architecture that may be installed on a machine, according to some examples.

FIG. 6 is a block diagram 600 illustrating software architecture 602, which can be installed on any one or more of the devices described above. For example, in various embodiments, user devices 110 and servers and systems 130, 62, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and input/output (I/O) components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as third-party applications 666 and 667. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
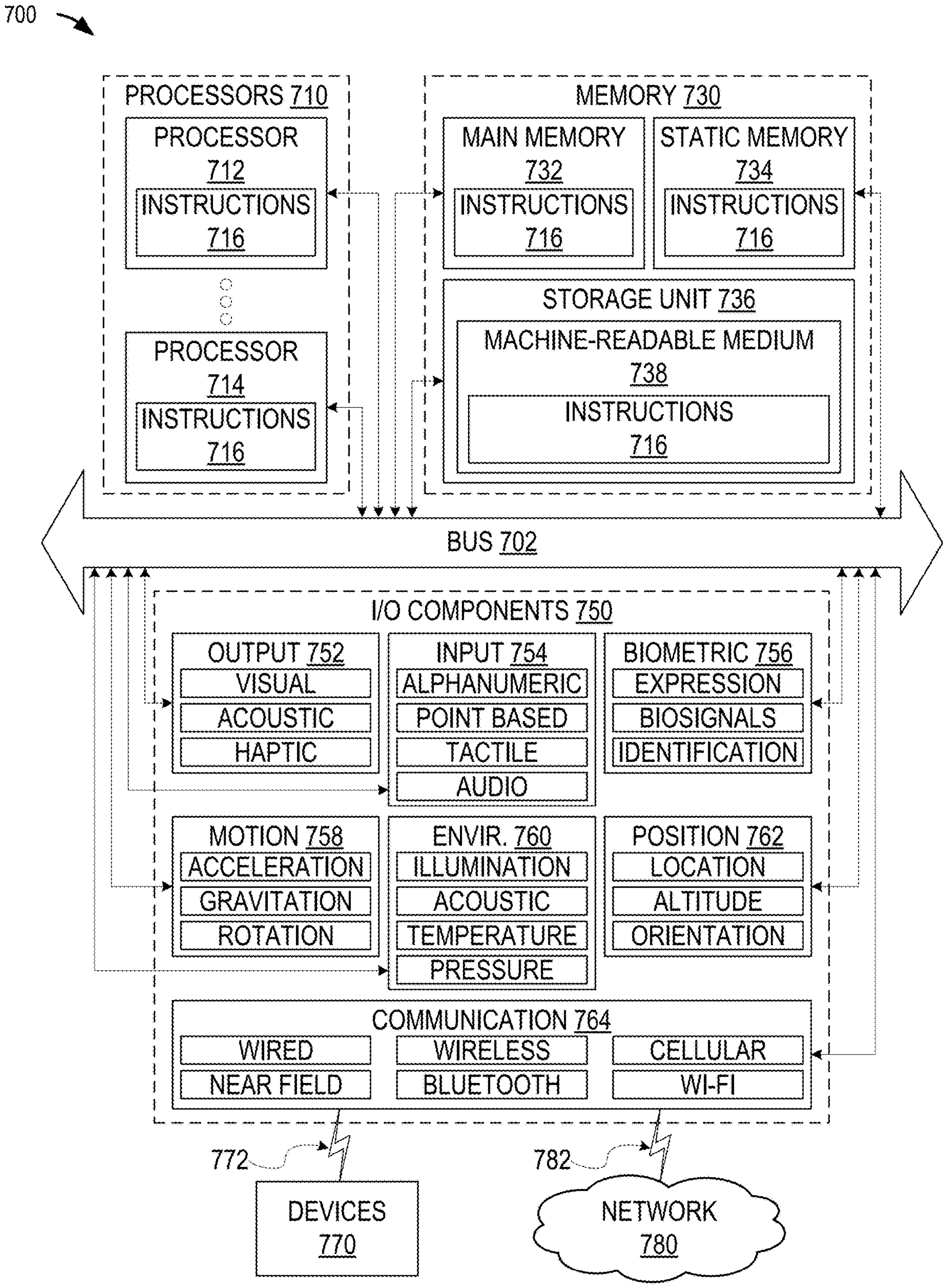
FIG. 7 illustrates a diagrammatic representation of a machine, in the form of a computer system, within which a set of instructions may be executed for causing the machine to perform any one or more of the methodologies discussed herein, according to some examples.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or system 130, 102, 120, 122, 124, etc., or a user device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the machine-readable medium 738 should be considered as being transportable from one physical location to another. Additionally, since the machine-readable medium 738 is tangible, the machine-readable medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:

initiating a Live Data Connector (LDC);

accessing, via the LDC, a configuration file comprising a security certificate;

analyzing, via the LDC, the configuration file to determine whether the configuration file contains a Java KeyStore (JKS) certificate to be used by the LDC to exchange data between an on-premise application and a cloud system;

based on determining that the configuration file contains a JKS certificate that is not compatible with the LDC, automatically converting the JKS certificate to a Public-Key Cryptography Standards (PKCS12) format certificate via a Java Virtual Machine of the LDC by performing operations comprising:

determining a public key for the JKS certificate;

determining a private key for the JKS certificate;

determining a chain of trusted authority certificates that establish validity of the JKS certificate;

generating a PKCS12 container containing the public key, private key, and the chain of trusted authority certificates; and generating a PKCS12 format certificate by exporting PKCS12 container as a bytes array; and providing, via the LDC, the PKCS12 format certificate to a web server for Secure Sockets Layer (SSL) configuration, the web server configured to establish secure communications using the PKCS12 format certificate in real time from a request to access a service via the web server.

2. The computer-implemented method of claim 1, wherein determining that the configuration file is associated with a JKS certificate is based on a file extension for a security certificate in the configuration file.

3. The computer-implemented method of claim 1, wherein the PKCS12 format certificate is provided via a Virtual Machine of the LDC.

4. The computer-implemented method of claim 1, wherein accessing the configuration file and determining whether the configuration file contains a JKS certificate is done via a Virtual Machine of the LDC.

5. The computer-implemented method of claim 1, wherein the PKCS12 format certificate is generated and provided to the web server in real time or near real time from initiating the LDC.

6. The computer-implemented method of claim 1, wherein the PKCS12 format certificate is provided to the web server via a Virtual Machine of the LDC.

7. The computer-implemented method of claim 1, wherein the LDC is initialized based on a first request to access a service via the web server, and the method further comprises:

receiving, at the LDC, a second request to access a service via a second web server;

accessing, via the LDC, a second configuration file associated with a second security certificate;

analyzing, via the LDC, the second configuration file to determine whether the second configuration file contains a JKS certificate to be used by the LDC to exchange data between an on-premise application and a cloud system; and based on determining that the second configuration file does not contain a JKS certificate, providing the second security certificate to the second web server for SSL configuration.

8. The computer-implemented method of claim 1, wherein the JKS certificate is associated with the on-premise application.

9. The computer-implemented method of claim 1, wherein the chain of trusted authority certificates comprises a global root authority certificate and at least one of a company authority certificate or a regional authority certificate.

10. The computer-implemented method of claim 1, wherein the LDC is configured to receive requests from the cloud system and facilitate communications between the cloud system and the on-premise application using the generated PKCS12 format certificate.

11. A system comprising:

a memory that stores instructions; and one or more processors configured by the instructions to perform operations comprising:

initiating a Live Data Connector (LDC);

accessing, via the LDC, a configuration file comprising a security certificate;

analyzing, via the LDC, the configuration file to determine whether the configuration file contains a Java KeyStore (JKS) certificate to be used by the LDC to exchange data between an on-premise application and a cloud system;

based on determining that the configuration file contains a JKS certificate that is not compatible with the LDC, automatically converting the JKS certificate to a Public-Key Cryptography Standards (PKCS12) format certificate via a Java Virtual Machine of the LDC by performing operations comprising:

determining a public key for the JKS certificate;

determining a private key for the JKS certificate;

determining a chain of trusted authority certificates that establish validity of the JKS certificate;

generating a PKCS12 container containing the public key, private key, and the chain of trusted authority certificates; and generating a PKCS12 format certificate by exporting PKCS12 container as a bytes array; and providing, via the LDC, the PKCS12 format certificate to a web server for Secure Sockets Layer (SSL) configuration, the web server configured to establish secure communications using the PKCS12 format certificate in real time from a request to access a service via the web server.

12. The system of claim 11, wherein determining that the configuration file is associated with a JKS certificate is based on a file extension for a security certificate in the configuration file.

13. The system of claim 11, wherein the PKCS12 format certificate is provided via a Virtual Machine of the LDC.

14. The system of claim 11, wherein accessing the configuration file and determining whether the configuration file contains a JKS certificate is done via a Virtual Machine of the LDC.

15. The system of claim 11, wherein the PKCS12 format certificate is generated and provided to the web server in real time or near real time from initiating the LDC.

16. The system of claim 11, wherein the PKCS12 format certificate is provided to the web server via a Virtual Machine of the LDC.

17. The system of claim 11, wherein the LDC is initialized based on a first request to access a service via the web server, and the operations further comprise:

receiving, at the LDC, a second request to access a service via a second web server;

accessing, via the LDC, a second configuration file associated with a second security certificate;

analyzing, via the LDC, the second configuration file to determine whether the second configuration file contains a JKS certificate to be used by the LDC to exchange data between an on-premise application and a cloud system; and based on determining that the second configuration file does not contain a JKS certificate, providing the second security certificate to the second web server for SSL configuration.

18. The system of claim 11, wherein the JKS certificate is associated with the on-premise application.

19. The system of claim 11, wherein the chain of trusted authority certificates comprises a global root authority certificate and at least one of a company authority certificate or a regional authority certificate.

20. A non-transitory computer-readable medium comprising instructions stored thereon that are executable by at least one processor to cause a computing device to perform operations comprising:

initiating a Live Data Connector (LDC);

accessing, via the LDC, a configuration file comprising a security certificate;

analyzing, via the LDC, the configuration file to determine whether the configuration file contains a Java KeyStore (JKS) certificate to be used by the LDC to exchange data between an on-premise application and a cloud system;

based on determining that the configuration file contains a JKS certificate that is not compatible with the LDC, automatically converting the JKS certificate to a Public-Key Cryptography Standards (PKCS12) format certificate via a Java Virtual Machine of the LDC by performing operations comprising:

determining a public key for the JKS certificate;

determining a private key for the JKS certificate;

determining a chain of trusted authority certificates that establish validity of the JKS certificate;

generating a PKCS12 container containing the public key, private key, and the chain of trusted authority certificates; and generating a PKCS12 format certificate by exporting PKCS12 container as a bytes array; and providing, via the LDC, the PKCS12 format certificate to a web server for Secure Sockets Layer (SSL) configuration, the web server configured to establish secure communications using the PKCS12 format certificate in real time from a request to access a service via the web server.

* * * * *